(12) United States Patent
Ahn et al.

(10) Patent No.: US 12,505,193 B2
(45) Date of Patent: Dec. 23, 2025

(54) ONE TIME LINK-BASED USER AUTHENTICATION IN IMAGE FORMING DEVICES

(71) Applicant: Hewlett-Packard Development Company, L.P., Spring, TX (US)

(72) Inventors: Sungjin Ahn, Seongnam-si (KR); Changnam An, Seongnam-si (KR); Gyeongmin Kang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 171 days.

(21) Appl. No.: 18/278,049

(22) PCT Filed: Aug. 18, 2021

(86) PCT No.: PCT/US2021/046436
§ 371 (c)(1),
(2) Date: Aug. 21, 2023

(87) PCT Pub. No.: WO2022/177602
PCT Pub. Date: Aug. 25, 2022

(65) Prior Publication Data
US 2024/0126860 A1    Apr. 18, 2024

(30) Foreign Application Priority Data
Feb. 22, 2021   (KR) .......... 10-2021-0023487

(51) Int. Cl.
*G06F 21/34* (2013.01)
*G06F 3/12* (2006.01)
*H04N 1/44* (2006.01)

(52) U.S. Cl.
CPC ............ *G06F 21/34* (2013.01); *G06F 3/1238* (2013.01); *H04N 1/444* (2013.01)

(58) Field of Classification Search
CPC ........ G06F 21/34; G06F 3/1238; H04N 1/444
See application file for complete search history.

(56) References Cited

U.S. PATENT DOCUMENTS

| | | | |
|---|---|---|---|
| 8,464,146 B2 | 6/2013 | Kang | |
| 8,767,225 B2 | 7/2014 | Sasakuma | |
| 9,001,370 B1* | 4/2015 | Nuggehalli | G06F 21/31 358/1.15 |
| 9,148,548 B2 | 9/2015 | Nuggehalli | |
| 9,223,525 B2 | 12/2015 | Villone | |
| 10,223,048 B2 | 3/2019 | Tonegawa | |
| 2008/0115207 A1 | 5/2008 | Go | |
| 2013/0242335 A1* | 9/2013 | Naitoh | G06F 3/1238 358/1.14 |
| 2013/0254300 A1* | 9/2013 | Berk | H04L 51/52 709/206 |
| 2014/0002850 A1 | 1/2014 | Kang | |

(Continued)

*Primary Examiner* — Clayton R Williams
(74) *Attorney, Agent, or Firm* — Foley & Lardner LLP

(57) ABSTRACT

An example image forming device includes a display to provide a user interface to receive an email address from a user and a processor to control executing a first application for processing an email including an one-time link (OTL) transmitted to the email address and for performing authentication of the user in response to selection of the OTL through the first application if the email address belongs to a first email domain.

17 Claims, 11 Drawing Sheets

(56) References Cited

U.S. PATENT DOCUMENTS

2015/0341292 A1* 11/2015 Ahmed ................ H04L 67/133
    709/206
2015/0356565 A1   12/2015 Chang et al.
2018/0288067 A1   10/2018 Zehler et al.
2020/0394004 A1* 12/2020 Balasubramanian .........................
    G06F 3/1222

* cited by examiner

ONE TIME LINK-BASED USER AUTHENTICATION IN IMAGE FORMING DEVICES

BACKGROUND

An image forming device may include an individual device such as a printer, a scanner, a photo copier, and a fax machine and may also include a multi-function printer (MFP) in which functions of these respective devices are integrated into a single device.

Such an image forming device may be used by a plurality of users. In that case, based on a user accessing the image forming device to use its function, the image forming device may authenticate whether the user has a legitimate authority.

DETAILED DESCRIPTION

Figure 1:
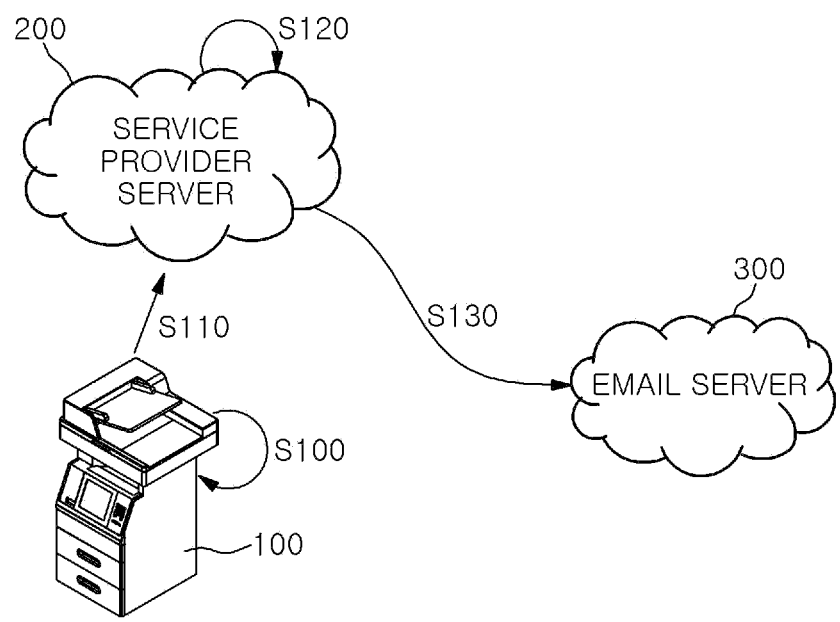
FIG. 1 is a diagram illustrating an initial process of a user authentication method of an image forming device according to an example.

In the case of an image forming device that may be used by a plurality of users, the image forming device may provide a function for authenticating whether a user has a legitimate authority to access and use the image forming device. In various examples, different types of user authentication services may be provided to a user of an image forming device, in addition to a method of authenticating the legitimacy of the user by logging-in using his/her ID and password registered in the image forming device.

In an example, a one-time link (OTL)-based user authentication method of an image forming device is provided. In an example, an OTL-based user authentication method may include an operation of a user checking an email including an OTL and selecting the OTL. In various examples, the selecting of the OTL may be made by a user input such as clicking, highlighting, tapping, pressing, etc. on the OTL. According to an example, since a user may check an email including an OTL on an image forming device and select the OTL, without using a separate device such as a mobile phone or a personal computer (PC), the process of user authentication in the image forming device may be convenient.

Various terms used in the present disclosure are chosen from a terminology of commonly used terms in consideration of their function herein, which may be appreciated differently depending on a precedent case, an emerging new technology, and the like. In certain instances, some terms are to be construed as set forth in the detailed description. Accordingly, the terms used herein are to be defined consistently with their meanings in the context of the present disclosure, rather than simply by their plain and ordinary meaning.

The terms "comprising," "including," "having," "containing," etc. are used herein to describe the presence of the elements listed thereafter. Unless otherwise indicated, these terms and variations thereof are not meant to exclude the presence or addition of other elements.

As used herein, the ordinal terms "first," "second," and so forth are meant to identify several similar elements. Unless otherwise described, such terms are not intended to impose limitations, e.g., a particular order of these elements or of their use, but rather are used merely for referring to multiple elements separately. For instance, an element may be referred to in an example with the term "first" while the same element may be referred to in another example with a different ordinal number such as "second" or "third," In such examples, such ordinal terms are not to limit the scope of the present disclosure. Also, the use of the term "and/or" in a list of multiple elements is inclusive of all possible combinations of the listed items, including any one or plurality of the items.

The term "image forming job" as used herein may encompass any of a variety of image-related jobs, such as a print job, a scan job, a photocopy job, a facsimile job, and the like, that involve an operation of forming an image and/or other processing operation, e.g., creation, generation and/or transfer of an image file. Furthermore, an image forming job performed by an image forming device may comprise various jobs related to printing, photocopying, scanning, faxing, storing, transmitting, coating, etc.

The term "image forming device" as used herein may encompass any of a variety of devices, such as printers, scanners, photocopiers, facsimile machines, multi-function printers (MFFs), display devices and so on, that carry out an image forming job. Moreover, an image forming device may be a two-dimensional (2D) or three-dimensional (3D) image forming device. Such an image forming device can provide basic functions such as photocopying, printing, scanning, faxing, etc, as well as various additional functions.

The term "user" as used herein may refer to a person who manipulates an image forming device to operate an image forming job. Further, the term "administrator" as used herein may refer to a person who has access to the entire functionality of an image forming device. In some examples, one person may have both the roles of an administrator and a user.

Certain examples of the present disclosure will now be described with reference to the accompanying drawings. The present disclosure should not be construed as limited to the examples set forth herein. Rather, these examples are given in order to provide a better understanding of the scope of the present disclosure.

Hereinafter, examples will be described with reference to the accompanying drawings.

First, example operations of a user authentication method for an image forming device will be schematically described with reference to FIGS. 1, 2, and 4.

In an example, devices for providing GTL-based user authentication may include an image forming device 100, a service provider server 200, an email server 300, an GTL web application 400, and a user terminal 500.

A service provider refers to an entity that may provide a service through a service solution application installed in the image forming device 100, and the service provider server 200 indicates a server operated by a service provider to support an image forming operation and various types of user authentication, using a service solution application installed in the image forming device 100. In an example, the service provider server 200 may perform a function such as issuing a token for user authentication to support OTL-based user authentication.

The image forming device 100 may allow a user to log in to the service provider server 200 to perform an image forming operation (e.g., an image forming job such as copying, printing, scanning, faxing, etc.). Examples of applications used on the image forming device 100 may include a solution application, an email client application, a background service, and the like. The solution application refers to an application that allows a user to use functions supported by the service provider server 200, the email client application refers to an application that provides an email service so that a user may use his/her email account on the image forming device 100, and the background service refers to a service performed in the background of the image forming device 100 without having a separate user interface. In an example, the background service performs an operation of transmitting to the solution application a token transmitted from the OTL web application 400 on the cloud to be described below.

The email server 300 refers to a server that provides an email service such as Gmail, Outlook mail, Hotmail, etc.

The OTL web application 400 may perform a function of relaying a token for user authentication provided from the service provider server 200 between the image forming device 100 and the service provider server 200. The OTL web application 400 may be executed on the image forming device 100, but may also be separately executed on the cloud based on it being difficult to check an email on the image forming device 100 due to security reasons, etc. In this disclosure, for the sake of convenience of description, an example is described in which the OTL web application 400 is executed on the cloud, but the present disclosure is not limited thereto.

The user terminal 500 may refer to an information processing device that may be used by a user, such as a computer, a laptop, a tablet PC, a mobile phone terminal, etc. The user may check an email through the user terminal 500 and select an OTL included in the body of the email.

FIG. 1 is a diagram illustrating an initial process of a user authentication method of an image forming device according to an example. In more detail, FIG. 1 illustrates an example process of transmitting an OTL by email based on a user requesting the OTL from the service provider server 200 through the image forming device 100.

In an example, the image forming device 100 transmits information to the service provider server 200 to request an OTL for user authentication. The information may include an email address of a user via which the user will receive the OTL, a status parameter to be used to identify the image forming device 100 and the user requesting the user authentication, and a uniform resource identifier (URI) address of the OTL web application 400. In an example, the email address of the user, the status parameter to identify the image forming device 100 and the user requesting the user authentication, and the uniform resource identifier (URI) address of the OTL web application 400 may be received or determined by the image forming device 100 in operation S100. Based on the information for requesting the OTL being transmitted to the service provider server 200 in operation S110, the service provider server 200 checks whether the received email address is valid. If the received email address is valid, the service provider server 200 forwards an email including the OTL for user authentication to the corresponding email address in operation S130.

In an example, the status parameter includes identification information of the image forming device 100 and identification information of the user. The status parameter may include information used to identify the sameness of a person requesting user authentication and may be generated, for example, based on the OAuth2.0 standard. An example of the status parameter may be generated by merging a serial number of the image forming device 100 that transmits the OTL request, users domain information, user's ID information, and the like. As will be described in more detail below, the status parameter is transmitted once based on the image forming device 100 requesting the OTL from the service provider server 200 and is transmitted once again along with a token based on the image forming device 100 requesting the token from the OTL web application 400. Accordingly, the OTL web application 400 determines whether the users who caused the transmission of the two status parameters are identical by comparing the two status parameters and transmits the token to the image forming device 100 based on the users being the same.

Based on receiving the OTL request from the image forming device 100 in operation S110, the service provider server 200 determines whether an email address to which the email including the OTL is to be transmitted belongs to a supportable email domain in operation S120 and forwards the email including the OTL to the email server 300 which provides the email service corresponding to the received email address based on the email address belonging to the supportable email domain in operation S130.

Subsequent operations will be described with reference to FIGS. 2 and 4.

Figure 2:
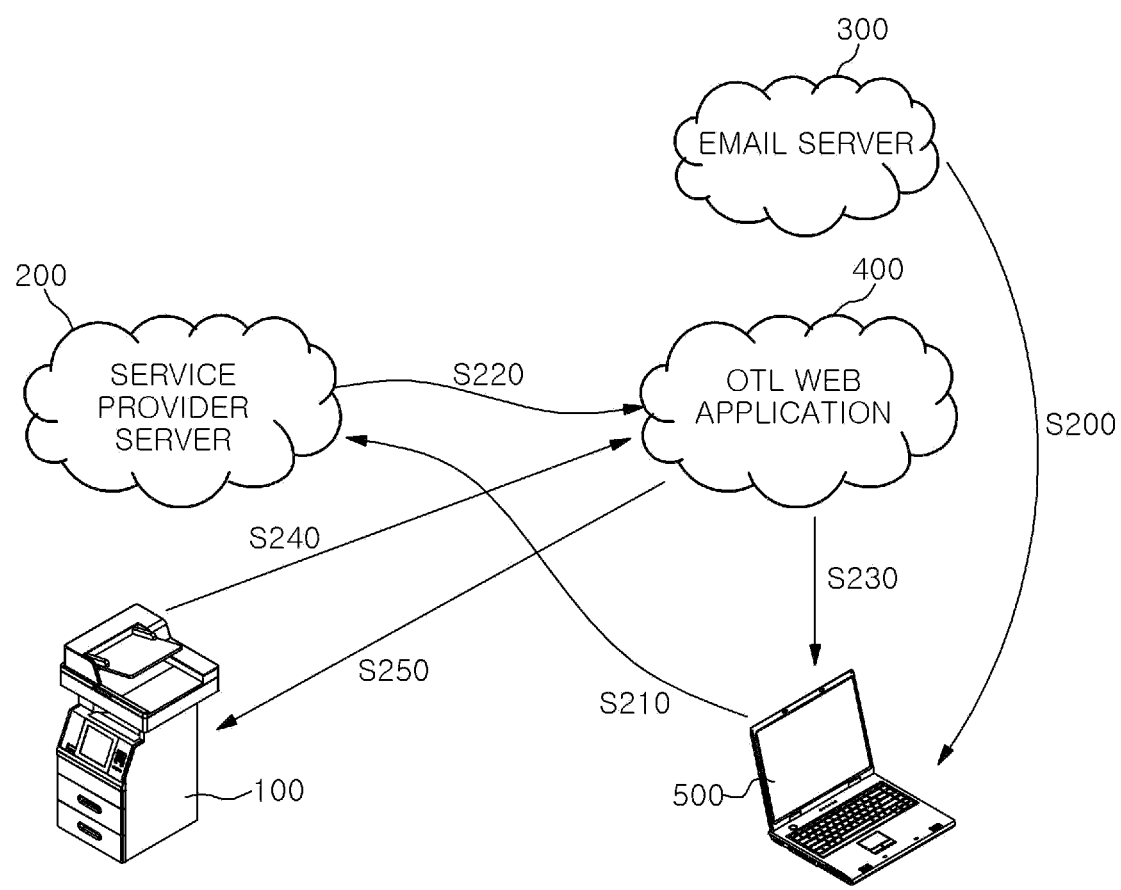
FIG. 2 is a diagram illustrating a process of a user authentication method of an image forming device according to an example.

FIG. 2 is a diagram illustrating a process of a user authentication method of an image forming device according to an example. In more detail, the example of FIG. 2 illustrates a schematic process of a user authentication method based on the image forming device 100 not providing an email confirmation service.

In an example, the image forming device 100 may not be able to check the email on the image forming device 100 for security reasons, etc. In this case, the user may check an email using the separate user terminal 500 (for example, his or her PC or mobile phone, etc.) in operation S200.

Based on the user selecting the OTL included in the email in operation S210 after checking the email in operation S200, the service provider server 200 issues the token for the authentication according to the OAuth2.0 standard. The token is transmitted to the OTL web application 400 according to the URI of the OTL web application 400 included in the OTL request transmitted to the service provider server 200 through operation S110 of FIG. 1 in operation S220.

However, in case of the example illustrated in FIG. 2, since the OTL request is performed by the image forming device 100 and the OTL is confirmed by the separate user terminal 500, the identity of the user who transmits the OTL request from the image forming device 100 and the user who checks the OTL needs to be ensured. Therefore, the OTL web application 400 may display a personal identification number (PIN) on the user terminal 500 of the user who has confirmed the email instead of immediately providing the token after the user selects the OTL in operation S230.

The user inputs the PIN to the image forming device 100, and the image forming device 100 transmits the input PIN to the OTL web application 400 in operation S240 to allow the OTL web application 400 to check the identity of the user. The OTL web application 400 determines whether the PIN provided to the user terminal 500 matches the PIN received from the image forming device 100 to check the identity of the user, and checks whether the image forming device of FIG. 1 and the image forming device of FIG. 2 are identical based on whether the status parameter received through the service provider server 200 in FIG. 1 matches the status parameter transmitted along with the PIN in operation S240. Based on the OTL web application 400 confirming the identity of the user and the image forming device, the token for the user authentication is transmitted to the image forming device 100 in operation S250. As further explained with reference to FIG. 3 below, the image forming device 100 may transmit the token provided from the OTL web application 400 to the service provider server 200, and the service provider server 200 may compare the token issued and transmitted in operation S220 with the token received from the image forming device 100 and complete the user authentication based on the tokens matching each other. In that case, the user authentication operation, that is, the user login is completed.

Figure 4:
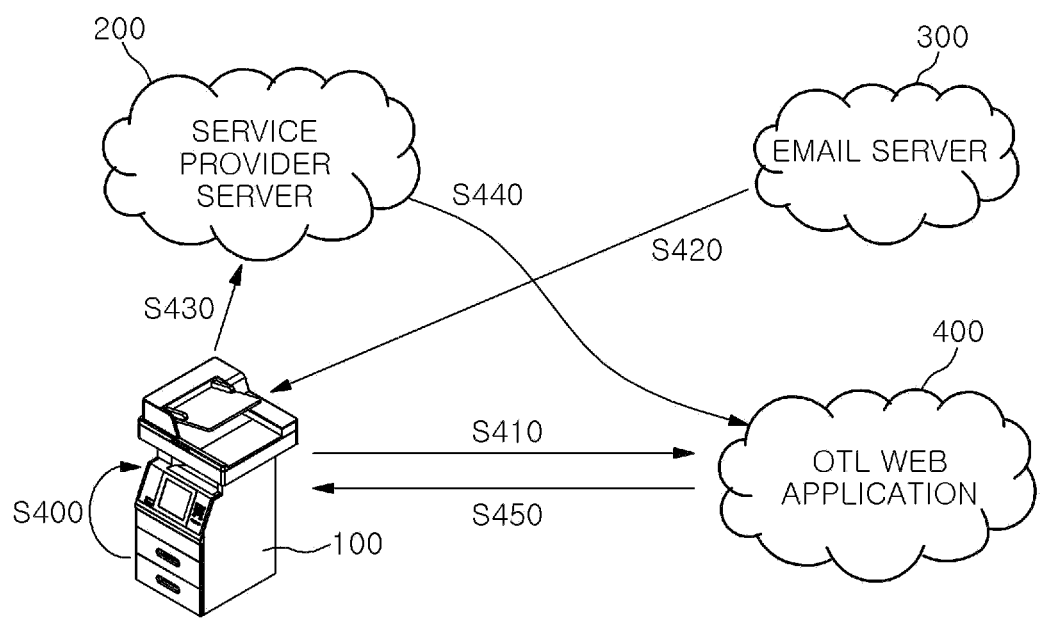
FIG. 4 is a diagram illustrating a process of a user authentication method of an image forming device according to an example.

FIG. 4 is a diagram illustrating a schematic process of a user authentication method of an image forming device according to an example. In more detail, FIG. 4 illustrates a process of a user authentication method based on an image forming device providing an email confirmation service through a separate email client application.

The image forming device 100 according to the example of FIG. 4 starts a background service through a solution application being displayed on the screen after the process of FIG. 1 described above and executes an email client application to provide an email confirmation service in operation S400. In this case, the solution application may enter a paused state and fade or disappear from the display. The background service requests a token from the OTL web application 400 in advance in operation S410 before the token for user authentication issued by the service provider server 200 is provided to the OTL web application 400 in operation S440. Since the token request to the OTL web application 400 via the background service may not need to be performed after the OTL web application 400 receives the token issued by the service provider server 200, operation S410 may be performed before the user selects the OTL, before the service provider server 200 issues the token for the user authentication, or before the OTL web application 400 receives the token issued by the service provider server 200.

In operation S420, the user checks the email including the OTL transmitted to the user email address through the email client application which was executed on the image forming device 100, and selects the OTL included in the email in operation S430. In response to the user's selection of the OTL included in the email in operation S430, the service provider server 200 issues the token and transmits the token, issued to the OTL web application 400, through the URI of the OTL web application 400, which was received in operation S110 in FIG. 1, in operation S440.

Based on receiving the token from the service provider server 200, the OTL web application 400 checks whether there is a token request already received from the image forming device 100 and determines that the corresponding token is the token issued for the same user as the one who selected the OTL using the email client application on the image forming device 100 based on there being the already received token request. Therefore, unlike the example of FIG. 2, the OTL web application 400 does not need to generate the PIN to check the sameness of the user.

In an example, the OTL web application 400 checks the status parameter according to the token request already received in operation S410 to check the sameness of the image forming device and transmits the token received from the service provider server 200 to the image forming device 100 based on the sameness of the image forming device being confirmed in operation S450.

Based on receiving the token from the OTL web application 400, the image forming device 100 terminates the email client application and forwards the token to the service provider server 200 for authentication while resuming the solution application in the paused state, thereby to complete the user's login operation.

Hereinafter, example operations for user authentication of the image forming device according to the example of FIGS. 2 and 4 will be described in terms of data flow with reference to FIGS. 3 and 5.

Figure 3:
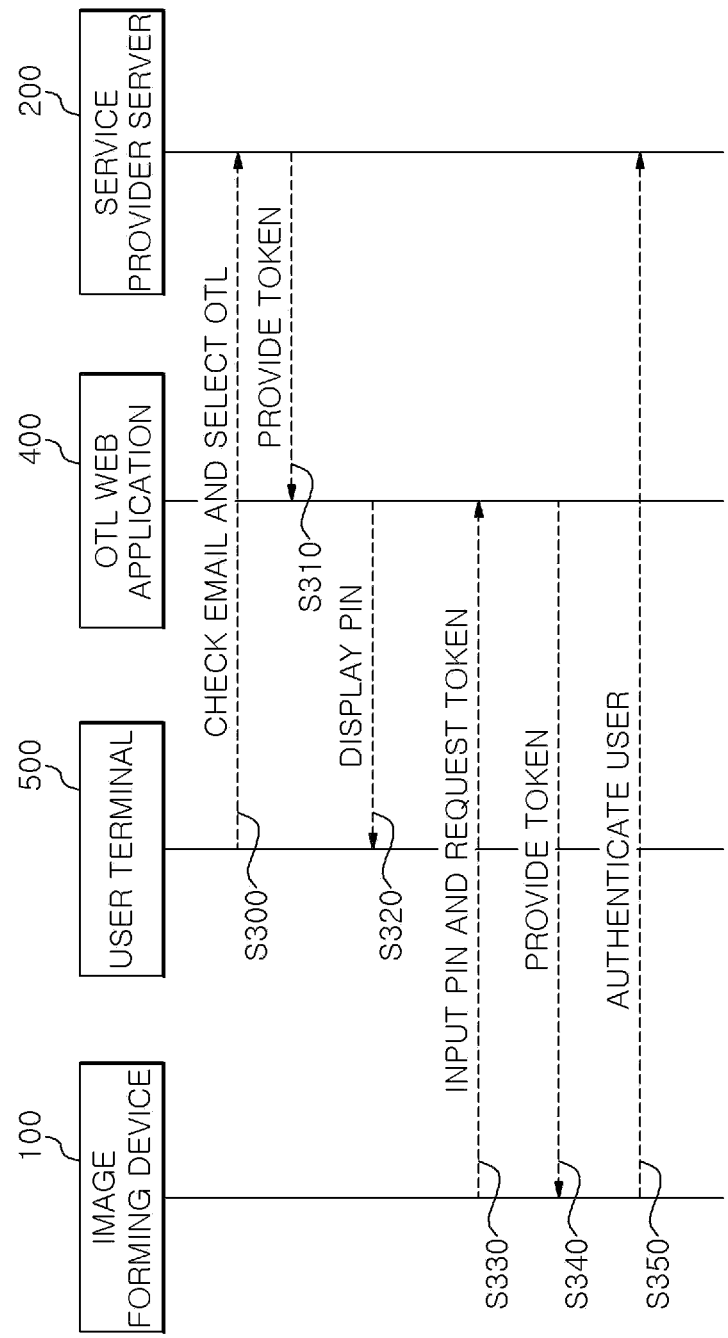
FIG. 3 is a diagram illustrating example operations for user authentication of the image forming device according to the example of FIG. 2 in terms of data flow.

FIG. 3 is a diagram illustrating example operations for user authentication of the image forming device according to the example of FIG. 2 in terms of data flow.

Based on the user checking the email forwarded to the email address by using the user terminal 500 separate from the image forming device 100 and selecting the OTL included in the email in operation S300, the service provider server 200 provides the token for the user authentication to the OTL web application 400 in operation S310, and the OTL web application 400 displays the FIN on the user terminal 500 to ensure the sameness of the user who requested the token through the image forming device 100 and the user who selected the OTL in operation S320. The user inputs the PIN displayed on his/her terminal 500 to the image forming device 100, and the image forming device 100 transmits the token request including the input PIN to the OTL web application 400 in operation S330. The OTL web application 400 determines whether the PIN received in operation S330 matches the PIN provided to the user terminal 500 by the OTL web application 400 in operation S320 to check the sameness of the user, and provides the token to the image forming device 100 based on the two PINs matching each other in operation S340. The image forming device 100 transmits the token provided from the OTL web application 400 to the service provider server 200, and the service provider server 200 compares the token issued by it and the token received from the image forming device 100 and completes the user authentication based on the tokens matching each other in operation S350.

Figure 5:
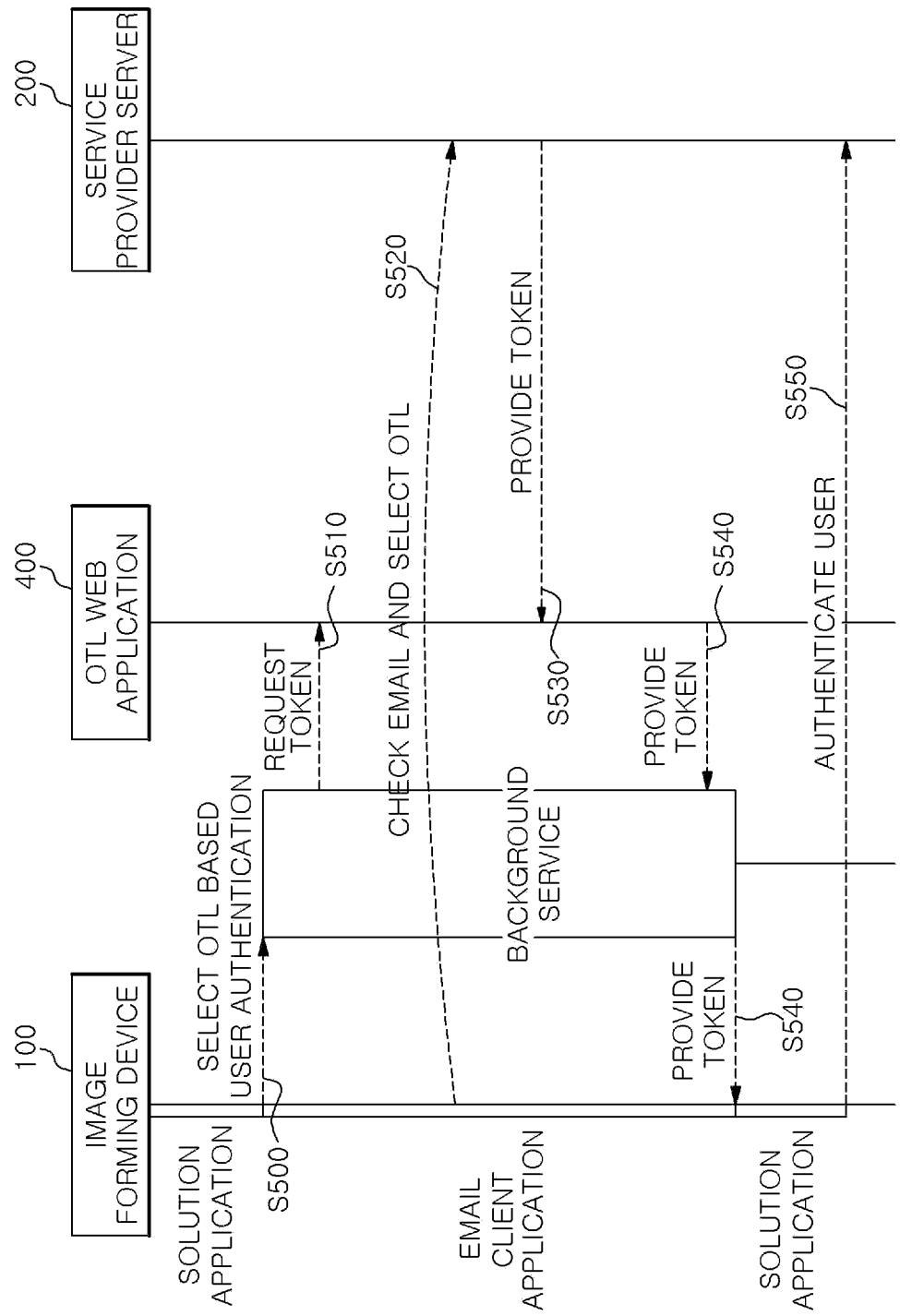
FIG. 5 is a diagram illustrating example operations for user authentication of the image forming device according to the example of FIG. 4 in terms of data flow.

FIG. 5 is a diagram illustrating example operations for user authentication of the image forming device according to the example of FIG. 4 in terms of data flow.

Based on receiving the selection of the OTL-based user authentication from the user by the input of the email address or the like, the image forming device 100 pauses the solution application being executed, executes the background service, and executes the email client application in operation S500. The background service requests the corresponding token from the OTL web application 400 in advance in operation S510 before the token for the user authentication issued by the service provider server 200 is provided to the OTL web application 400. FIG. 5 illustrates that the token request operation by the background service in operation S510 is performed before the checking of the email and selecting of the OTL in operation S520 through the email client application. However, this is only an example and the present disclosure is not limited thereto. As previously described with reference to FIG. 4, the token request in operation S510 by the background service may be performed until operation S530 of the service provider server 200 providing the token to the OTL web application 400 is performed.

In an example, the image forming device 100 allows the user to check the email forwarded to his/her email address through the email client application and select the OTL included in the email in operation S520. The service provider server 200 provides the token to the OTL web application 400 in operation S530 in response to the user's selection of the OTL through the email client application in the image forming device 100 in operation S520, and the OTL web application 400 provides the token to the image forming device 100 through the background service in operation S540. Based on receiving the token, the image forming device 100 terminates the running email client application and resumes the execution of the solution application in the paused state, as well as transmits the received token to the service provider server 200 to complete the user authentication with the received token in operation S550.

Figure 6:
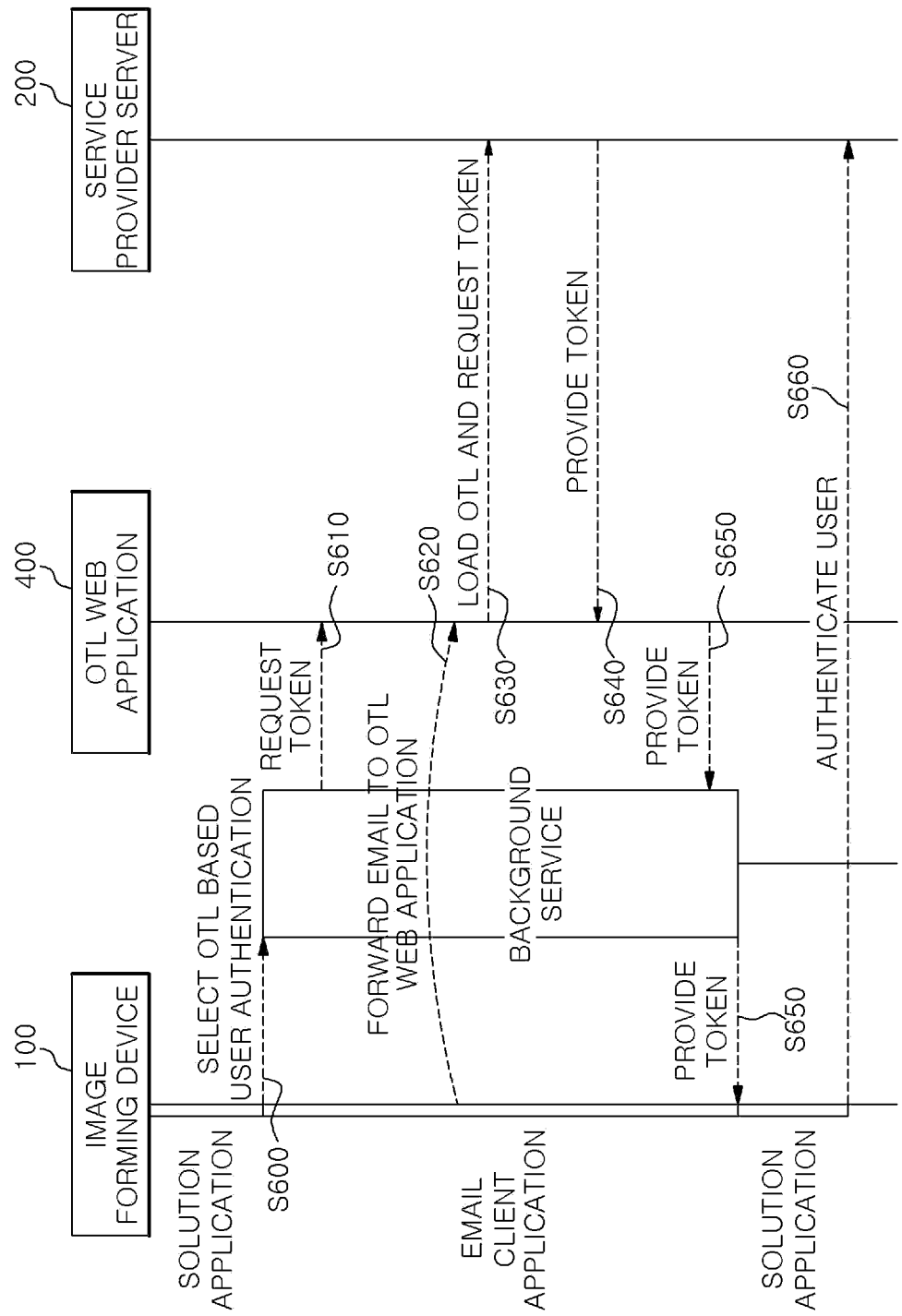
FIG. 6 is a diagram illustrating example operations for user authentication of the image forming device according to the example of FIG. 4.

FIG. 6 is a diagram illustrating example operations for user authentication of the image forming device according to the example of FIG. 4.

External link access through the email client application, that is, access to the outside using the OTL in the email client application, may be blocked due to a security policy, a network situation, etc. of a location at which the image forming device 100 is disposed. To cope with such a case, an example of the image forming device 100 may cause the OTL web application 400 to perform the token request operation by selecting the OTL on behalf of the email client application.

In a case in which the OTL-based user authentication method is selected by the user, operations S600 and S610, performed by the image forming device 100, of pausing the running solution application, executing the email client application, and requesting the token from the OTL web application 400 through the background service are the same as operations S500 and S510 of FIG. 5. However, based on the operation of the OTL selection not being able to be performed through the email client application due to environmental constraints, that is, based on access to the outside through the OTL not being able to be made, the image forming device 100 may forward the email including the OTL to the OTL web application 400 through the email client application in operation S620.

The OTL web application 400 may extract and load the OTL included in the body of the forwarded email and request the token from the service provider server 200 in operation S630 to perform the token request on behalf of the email client application. In this case, the operation of forwarding the email including the OTL to the OTL web application 400 through the email client application may be performed according to an explicit instruction of a user to forward an email, or automatically performed by the email client application without any user input.

Thereafter, operations S640 and S650 of providing the token to the image forming device 100 from the service provider server 200 through the OTL web application 400 and the user authentication operation S660 are the same as operations S540 to S560 of FIG. 5.

Figure 7:
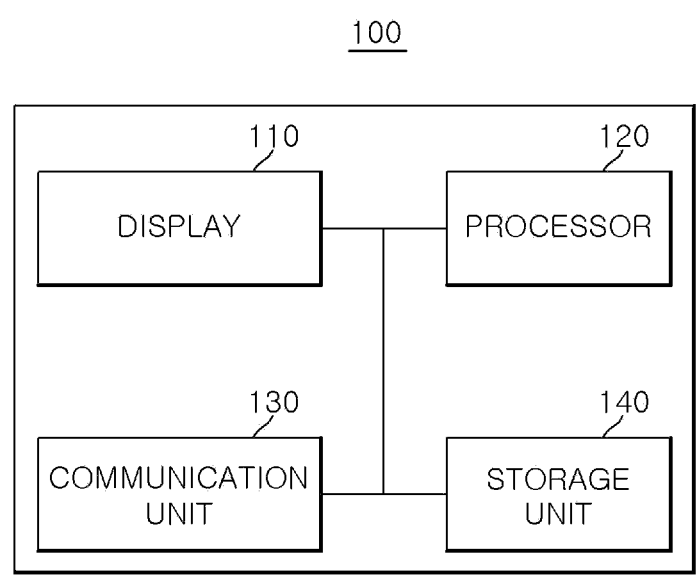
FIG. 7 is a functional block diagram illustrating an image forming device according to an example.

FIG. 7 is a functional block diagram illustrating an image forming device according to an example.

An example of the image forming device 100 may include a display 110, a processor 120, a communication unit 130, and/or a storage unit 140.

The display 110 may receive an input such as an email address and an OTL-based authentication menu selection from a user and provide a user interface for providing information to the user.

The processor 120 may control and perform an operation of the image forming device 100 and may include a central processing unit (CPU), a graphic processing unit (GPU), and the like. For example, the processor 120 may execute a command stored in the storage unit 140 or may store information in the storage unit 140 and read the stored information. For example, the processor 120 may receive information for control of the image forming device 100 through the display 110, obtain the information from the storage unit 140, and display the information to be provided to the user on the display 110. In addition, the processor 120 may check whether the email address input by the user through the user interface on the display 110 belongs to a predefined email domain and execute the email client application based on the email address belonging to the predefined email domain. In that case, the user may check the email transmitted to the users email address through the display 110 of the image forming device 100 and select the OTL included in the body of the email. The processor 120 may control the image forming device 100 to perform the user authentication in response to the users selection of the OTL through the email client application.

The communication unit 130 may enable the image forming device 100 to communicate with another device, i.e., the service provider server 200, the OTL web application 400 based on the OTL web application 400 being executed on the cloud, the user terminal 500, etc. The communication unit 130 may include various communication modules. For example, the communication unit 130 may include a wireless communication module or a wired communication module. The wireless communication module may be a module that supports, for example, Wi-Fi, Wi-Fi Direct, Bluetooth, Ultra Wide Band (UWB), Long Term Evolution (LTE), Long Term Evolution-Advanced (LTE-A), 5G, Near Field Communication (NFC), etc., and the wired communication module may be a module that supports Local Area Network (LAN), Universal Serial Bus (USB), High Definition Multimedia Interface (HDMI), etc. but the present disclosure is not limited thereto.

The storage unit 140 may be implemented by various storage media, such as a random access memory (RAM) or a read-only memory (ROM), which may store data. The storage unit 140 may store various types of information and may store, for example, an instruction executable by the processor 120, information on the image forming device 100, information such as the user's ID/password, information input from the user, and the like.

A user authentication method of the image forming device 100 according to the examples described above will be collectively described with reference to the flowchart illustrated in FIG. 8 and the user interfaces illustrated in FIGS. 9 and 10.

Figure 8:
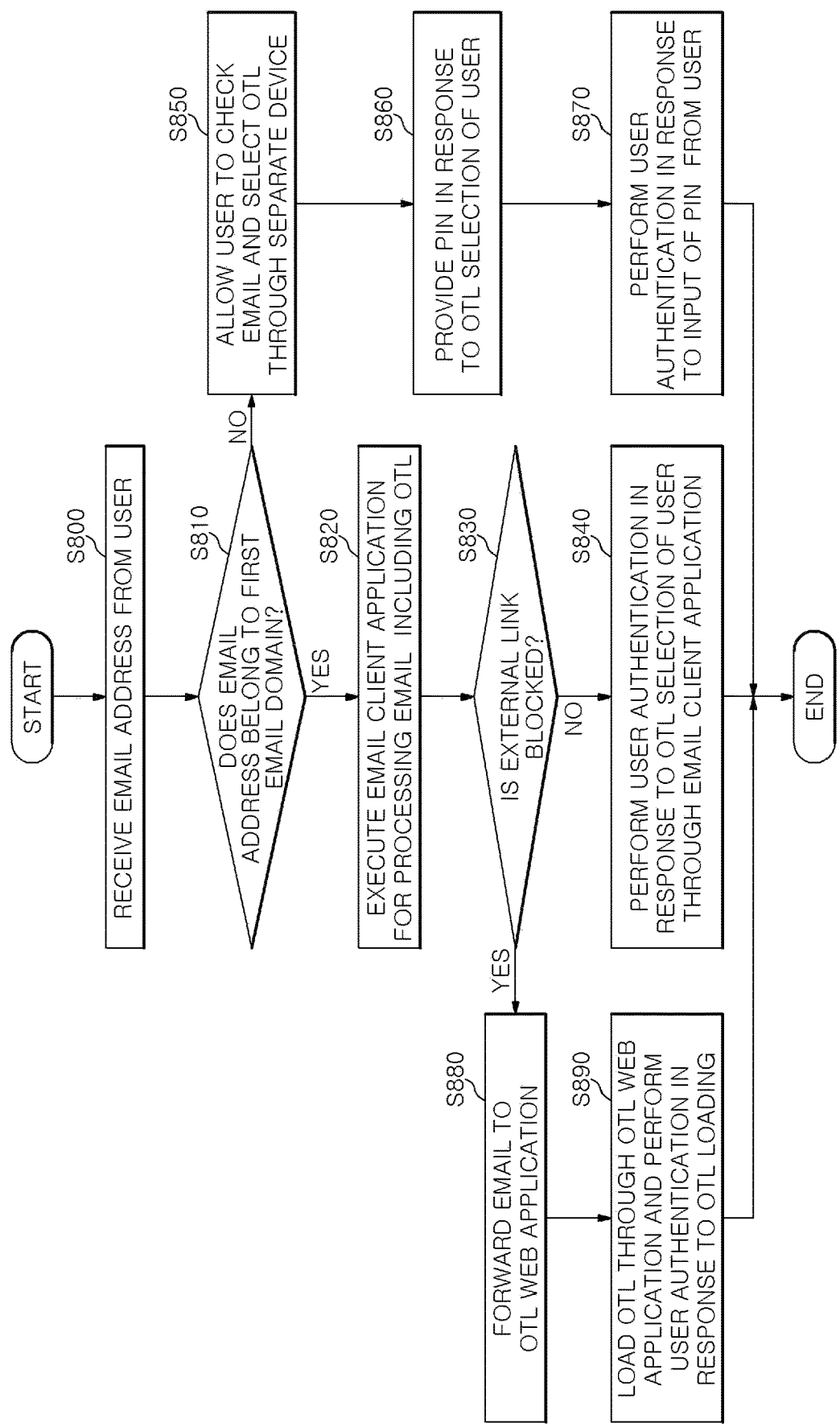
FIG. 8 is a flowchart illustrating a user authentication method of an image forming device according to an example.

FIG. 8 is a flowchart collectively illustrating a user authentication method of an image forming device according to an example. FIG. 9 is a diagram illustrating example operations for user authentication of the image forming device according to the example of FIG. 5 in terms of a user interface. FIG. 10 is a diagram illustrating example operations based on an email address input in the example of FIG. 8 not belonging to a predetermined email domain in terms of a user interface.

Figure 9:
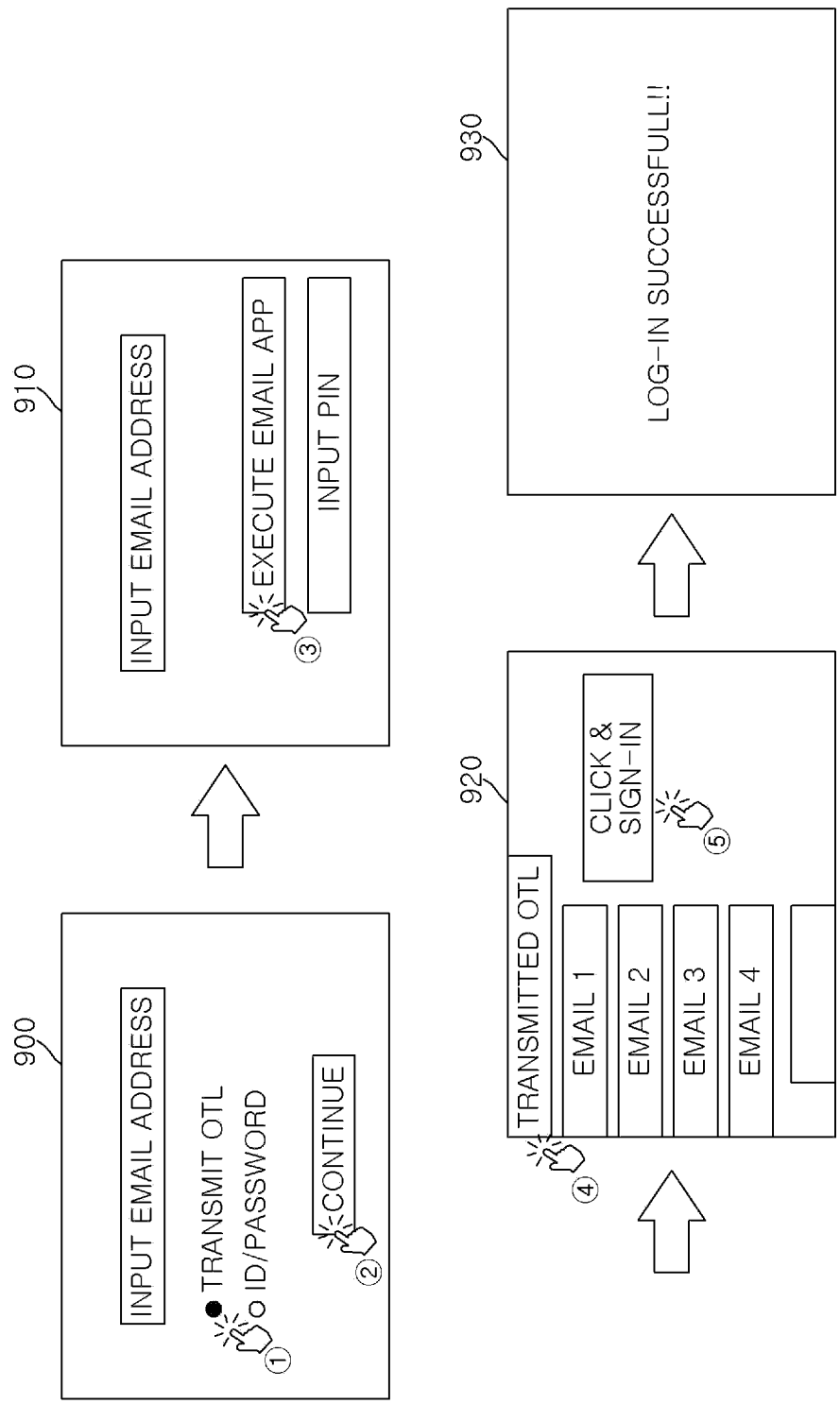
FIG. 9 is a diagram illustrating example operations for user authentication of the image forming device according to the example of FIG. 5 in terms of a user interface.

As displayed on the screen 900 of FIG. 9, based on an email address being input from the user and a menu to transmit an OTL being selected in operation S800, the processor 120 of the image forming device 100 determines whether the input email address belongs to a predefined email domain such as Gmail, Hotmail, Outlook mail, etc, in operation S810.

Based on the input email address belonging to a predefined email domain (Yes' in operation S810), the processor 120 of the image forming device 100 executes the email client application to process the email including the OTL on the image forming device 100 in operation S820. In an example, the email client application may be automatically executed without a user input or may be executed in response to the user selection of an "email application execution" menu as displayed on the screen 910 of FIG. 9.

The processor 120 of the image forming device 100 determines whether external access through a link selection is blocked at the location of the image forming device 100 in operation S830. The processor 120 performs user authentication in response to the user's selection of the OTL through the email client application in operation 3840 based on external access not being blocked ('No' in operation S830). The user's selection of the OTL may be performed by allowing the user to select the OTL included in the body of the email on the display 110 as displayed on the screen 920 of FIG. 9.

Thereafter, the processor 120 of the image forming device 100 may complete the user authentication through communication with the service provider server 200 in operation S840 and may display, on the display 110, a message indicating that the user authentication has been successfully performed as displayed on the screen 930 of FIG. 9 and thus the log in succeeds.

Figure 10:
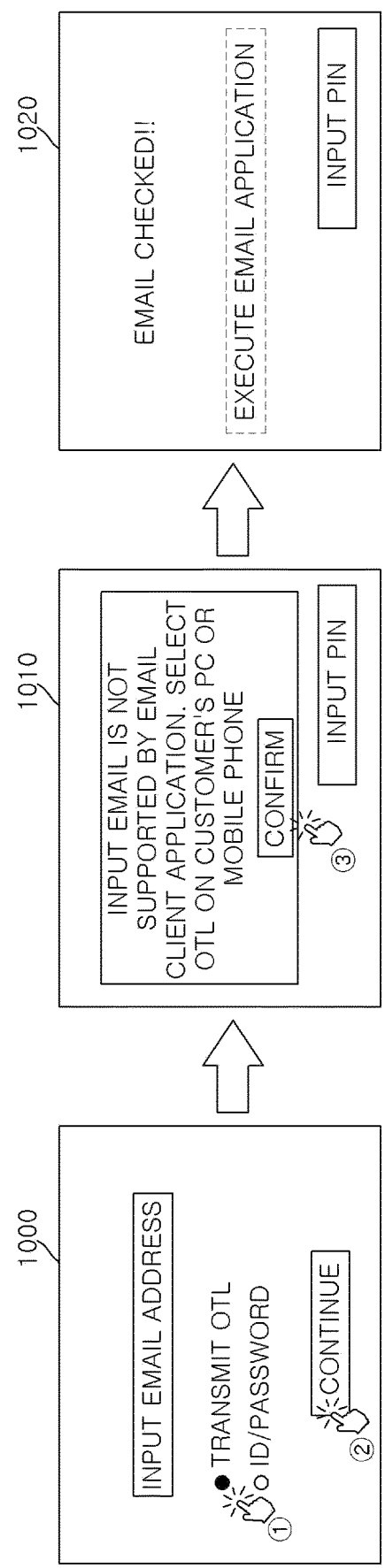
FIG. 10 is a diagram illustrating example operations based on an email address input in the example of FIG. 8 not belonging to a predetermined email domain in terms of a user interface.

Based on the email address input by the user as displayed on the screen 1000 of FIG. 10 not belonging to the predefined email domain supported by the image forming device 100 ('No' in operation S810), a message such as "input email address is not supported by the email client application." may be displayed on the display 110 as displayed on the screen 1010 of FIG. 10. In that case, the user may be notified that the email address input by the user is not supported by the email client application, and the user may check the email and select the OTL through a separate user terminal (e.g., a PC, a mobile phone, or the like) in operation S850.

Based on the user selecting the OTL included in the body of the email on a separate user terminal, the PIN is displayed on the user terminal in operation S860, and as displayed on the screen 1010 of FIG. 10, a message indicating that the email has been confirmed may be displayed on the display 110 of the image forming device 100. In this case, the email client application execution button is deactivated, and the PIN input menu that may receive the PIN displayed on the user terminal is activated.

Based on the user selecting the PIN input menu of the screen 1020 of FIG. 10 and inputting the PIN, the image forming device 100 performs the user authentication in operation S870.

Based on external access being blocked ('Yes' in operation S830), the processor 120 of the image forming device 100 may forward the email including the OTL to the OTL web application 400 through the email client application in operation S880. The OTL web application 400 may extract and load the OTL included in the body of the forwarded email and request the token from the service provider server 200 to perform the token request on behalf of the email client application such that the image forming device 100 may perform the user authentication in response to the OTL loading in operation S890. In this case, the operation of forwarding the email including the OTL to the OTL web application 400 through the email client application may be performed according to an explicit instruction of a user to forward an email, or automatically performed by the email client application without any user input.

Figure 11:
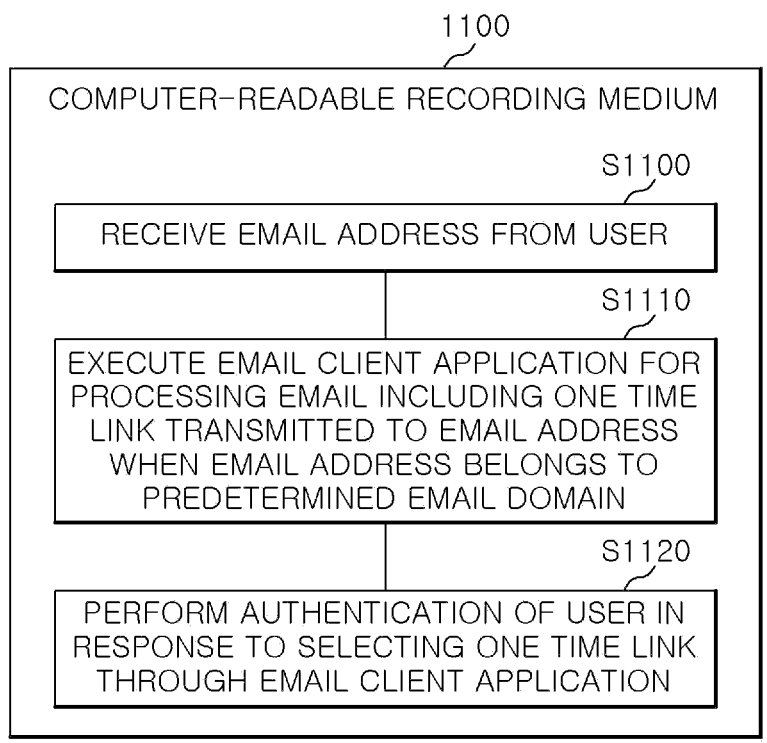
FIG. 11 is a schematic diagram of instructions included on a computer-readable recording medium according to an example.

FIG. 11 illustrates a non-transitory computer-readable recording medium including instructions to perform a method stored thereon according to an example.

Referring to FIG. 11, a non-transitory computer-readable recording medium 1100 may include instructions S1100 to receive an email address from a user.

In addition, the non-transitory computer-readable recording medium 1100 may include instructions S1110 to, based on the email address belonging to a predetermined email domain, execute an email client application for processing the email including an OTL transmitted to the email address.

In addition, the non-transitory computer-readable recording medium 1100 may include instructions S1120 to perform user authentication in response to selection of the OTL through the email client application.

In an example, the operations described above with reference to FIGS. 1 to 6 and 8 to 10, including the instructions S1100, S1110 and S1120 of FIG. 11, may be performed by a computer including a processor according to the execution of the instructions stored in the non-transitory computer-readable recording medium 1100. Therefore, the above description related to the configuration or operation of the image forming device to perform the OTL-based user authentication will be applied to parts omitted here.

The term "non-transitory computer-readable recording medium" as used herein refers to a medium that is capable of semi-permanently storing data and is readable by an apparatus, rather than a medium, e.g., a register, a cache, a volatile memory device, etc., that temporarily stores data. For example, the foregoing instructions may be stored and provided in a CD, a DVD, a hard disk, a Blu-ray disc, a USB, a memory card, a ROM device, or any of other type of non-transitory readable media.

In an example, the example methodology disclosed herein may be incorporated into a computer program product. The computer program product may be available as a product for trading between a seller and a buyer. The computer program product may be distributed in the form of a machine-readable storage medium, e.g., compact disc read only memory (CD-ROM), or distributed online through an application store, e.g., PlayStore™. For online distribution, at least a portion of the computer program product may be temporarily stored, or temporarily created, in a storage medium such as a server of the manufacturer, a server of the application store, or a storage medium such as a memory of a relay server.

The foregoing description has been presented to illustrate and describe various examples. It should be appreciated that many modifications and variations are possible in light of the above teaching. In various examples, suitable results may be achieved if the above-described techniques are performed in a different order, and/or if some of the components of the above-described systems, architectures, devices, circuits, and the like are coupled or combined in a different manner, or substituted for or replaced by other components or equivalents thereof.

Therefore, the scope of the disclosure is not to be limited to the precise form disclosed, but rather defined by the following claims and equivalents thereof.

What is claimed is:

1. An image forming device comprising:
    a display to provide a user interface; and
    a processor to:
    receive, at the user interface, an email address input by a user;
    execute a first application of the image forming device to generate an email including a one-time link (OTL) transmitted to the email address; and
    perform authentication of the user in response to receiving a selection of the OTL through the first application of the image forming device when the email address belongs to a first email domain.

2. The image forming device of claim 1, wherein the processor is to request transmission of the email including the OTL and provide a status parameter including identification information of the image forming device and identification information of the user to a server.

3. The image forming device of claim 1, wherein the processor is to request a token for the authentication of the user and provide a status parameter including identification information of the image forming device and identification information of the user to a second application, wherein the processor is to request the token before the token is provided to the second application.

4. The image forming device of claim 3, wherein the second application is executed on a cloud.

5. The image forming device of claim 1, wherein, in case that access to an external server using the OTL is not available, the processor is to forward the email to a second application through the first application to allow the second application to load the OTL and request a token for the authentication of the user.

6. The image forming device of claim 1, wherein, in case that the email address does not belong to the first email domain, the processor is to allow the user to check the email by a separate device through the user interface without executing the first application.

7. The image forming device of claim 6, wherein the processor is to request the user to input a personal identification number (PIN) for the authentication of the user through the user interface in response to selection of the OTL through the separate device.

8. The image forming device of claim 1, wherein the processor is to receive the selection of the OTL through the user interface of the image forming device.

9. The image forming device of claim 1, wherein the first application is an email client application executed by the processor of the image forming device.

10. A user authentication method in an image forming device, the method comprising:
    receiving, at a user interface, an email address from a user;
    executing a first application of the image forming device for processing an email including a one-time link (OTL) transmitted to the email address when the email address belongs to a first email domain; and
    performing authentication of the user in response to selection of the OTL through the first application of the image forming device when the email address belongs to the first email domain.

11. The user authentication method of claim 10, further comprising, after the receiving of the email address, requesting transmission of the email including the OTL and providing a status parameter including identification information of the image forming device and identification information of the user to a server.

12. The user authentication method of claim 10, further comprising requesting a token for the authentication of the user and providing a status parameter including identification information of the image forming device and identification information of the user to a second application, wherein the requesting of the token is performed before the token is provided to the second application.

13. The user authentication method of claim 10, further comprising, after the executing of the first application, in case that access to an external server using the OTL is not available, forwarding the email to a second application through the first application to allow the second application to load the OTL and request a token for the authentication of the user.

14. The user authentication method of claim 10, further comprising, in case that the email address does not belong to the first email domain, allowing the user to check the email by a separate device through the user interface without executing the first application.

15. The user authentication method of claim 14, further comprising requesting the user to input a personal identification number (PIN) for the authentication of the user through the user interface in response to selection of the OTL through the separate device.

16. A non-transitory computer-readable storage medium including instructions stored thereon for a user authentication method, the non-transitory computer-readable storage medium comprising:
    instructions to receive, at a user interface, an email address from a user;
    instructions to execute a first application of an image forming device for processing an email including a one-time link (OTL) transmitted to the email address when the email address belongs to a first email domain; and
    instructions to perform authentication of the user in response to selection of the OTL through the first application of the image forming device when the email address belongs to a first email domain.

17. The non-transitory computer-readable storage medium of claim 16, further comprising instructions to forward the email to a second application through the first application to allow the second application to load the OTL and request a token for the authentication of the user in case that access to an external server using the OTL is not available.

* * * * *